Nov. 3, 1970 P. ANGENIEUX 3,537,780
MOTION PICTURE FILM MAGAZINE
Filed Feb. 6, 1968 2 Sheets-Sheet 1
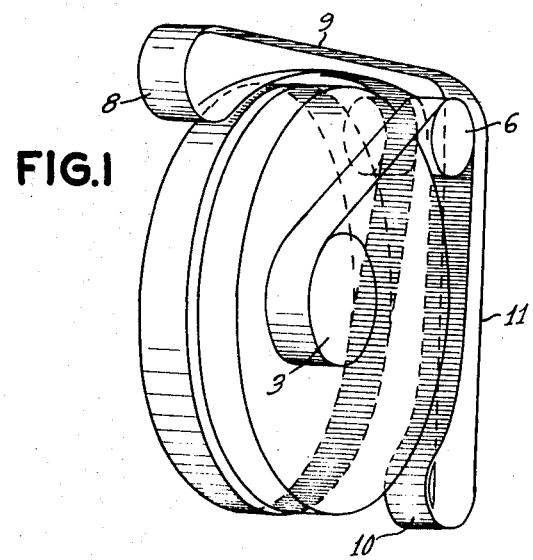
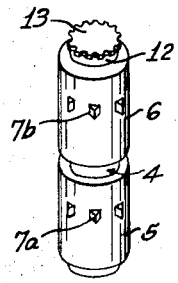
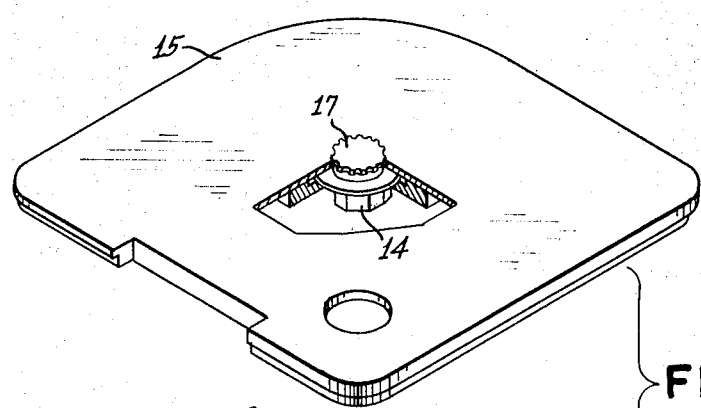
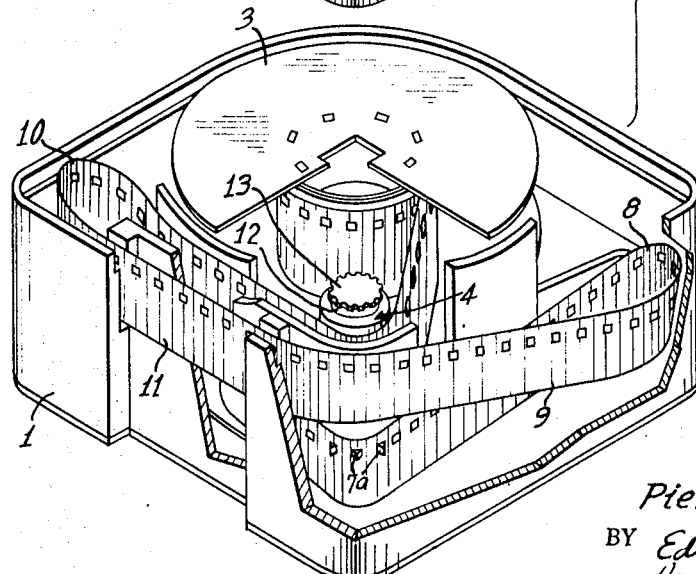
INVENTOR.
Pierre Angenieux
BY Edwin Levisohn &
Henry R Lerner
ATTORNEYS Nov. 3, 1970  P. ANGENIEUX  3,537,780
MOTION PICTURE FILM MAGAZINE
Filed Feb. 6, 1968  2 Sheets-Sheet 2
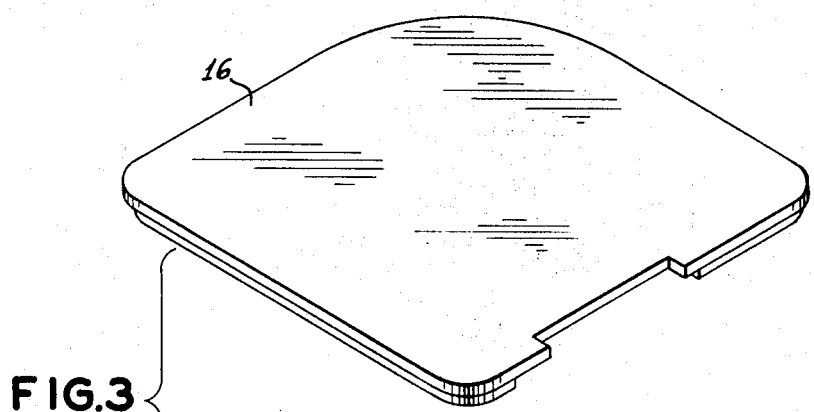
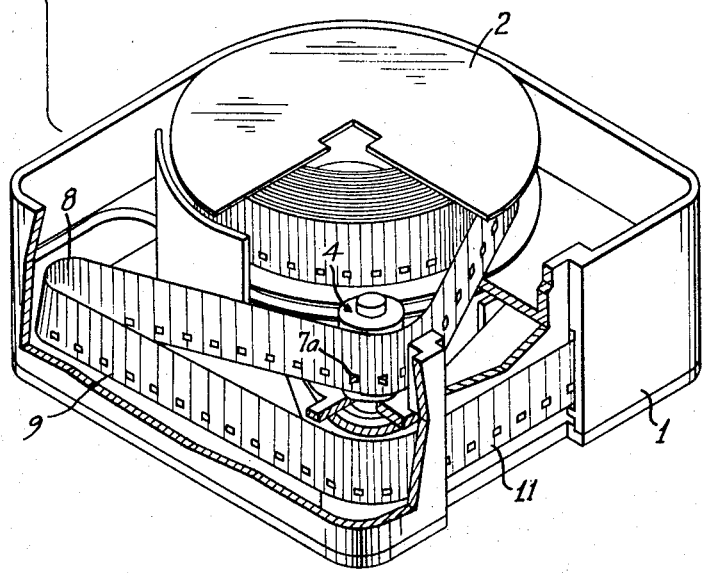
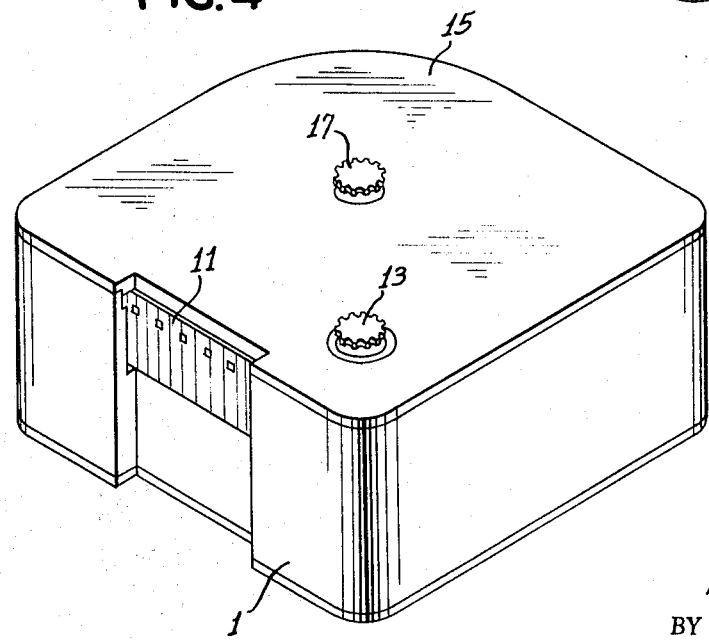
INVENTOR.
Pierre Angenieux
BY Edwin Levisohn &
Henry R. Lerner
ATTORNEYS

United States Patent Office 3,537,780
Patented Nov. 3, 1970

3,537,780
MOTION PICTURE FILM MAGAZINE
Pierre Angenieux, 27 Rue du Cherche-Midi,
Paris 6, France
Filed Feb. 6, 1968, Ser. No. 703,320
Claims priority, application France, Feb. 13, 1967,
94,620
Int. Cl. G03b 23/02
U.S. Cl. 352—78                    11 Claims

ABSTRACT OF THE DISCLOSURE

A film magazine adapted to receive motion picture film and intended for use in association with a motion picture camera. The film magazine comprises two compartments adapted to receive, respectively, a feed spool and a take-up spool for the motion picture film. The unexposed film strip on the feed spool is adapted to be unwound therefrom, intermittently moved past an exposure aperture, and wound onto a take-up spool. A substantially cylindrical member adapted to be rotatably driven by apparatus associated with the camera is provided with a pair of integral coaxial sprocket drums adapted to engage and drive the film strip. One of these sprocket drums is adapted to engage the film strip as it is unwound from the feed spool for controlling the rate of film feed. The other sprocket drum is adapted to engage the film strip prior to its being taken up by the take-up spool for controlling the rate of film take-up. The film strip extending between the two sprocket drums follows a path defining two hairpin shaped loops. The first of these loops is formed as the film strip emerges from the sprocket drum controlling the feed rate and such first loop is housed in the upper portion of the magazine. The second of these loops is formed before the film engages the other sprocket drum and is housed in the front portion of the magazine.

---

The present invention relates to film magazines for motion picture cameras, notably of the type comprising a feed spool and a take-up spool disposed side by side so as to be substantially coaxial.

A motion picture film magazine is normally adapted to receive a length of photosensitive film having at least one perforated edge. In such magazine, the unexposed film is wound on a feed spool and as it unwinds, it follows a predetermined path before being attached to the core of the take-up spool.

When the film magazine is properly fitted in a camera, the unexposed film, during its travel from the feed spool to the take-up spool, moves past an exposure gate and receives an intermittent motion from a single feeding claw engaging the film perforations in order to provide the required film movement between two successive exposures.

In substandard cameras generally intended for home use, this single claw is relied upon for driving the film, and the exposed film is wound on the take-up spool rotatably driven by a friction mechanism. In higher quality cameras, however, notably those utilizing wider film stock, it is deemed necessary to improve the regularity of the film movement by providing not only feeding claws but also a pair of sprocket drums, one of which is located at the film outlet of the feed spool and the other of which is located at the film inlet of the take-up spool, both drums driving the film by engaging the film perforations with their teeth.

The use of a device comprising a feed spool and a take-up spool disposed side by side is advantageous as a considerable reduction in the over-all dimensions of the magazine can be obtained. With such arrangement, however, the film transfer from one spool to the other must take place easily, without causing any interference in the film run.

The present invention relates to an improved film magazine of the type broadly set forth hereinabove which is adapted to be inserted in a motion picture camera. This magazine comprises two compartments disposed side by side and adapted to receive the feed spool and the take-up spool, respectively. This magazine further includes a rotatably driven unitary member of substantially cylindrical configuration, comprising a pair of coaxial solid sprocket drums. Rotation of said member causes one of said sprocket drums, hereinafter referred to as the feed drum, to feed the film at a predetermined velocity from the outlet of said feed spool, and causes the other sprocket drum, hereinafter referred to as the take-up drum, to deliver the exposed film to the take-up spool at exactly the same velocity. The film strip extending between the two sprocket drums follows a path comprising two substantially hairpin-shaped loops. The first hairpin loop formed at the outlet of the feed drum is located in the upper portion of the magazine so that the film emerging tangentially from the feed drum and directed firstly backward, is bent and then directed forwards and in a laterally oblique direction, so that the leading end of this loop is adjacent to the front end of the magazine. Under these conditions, the unexposed film strip directed from the first loop to the front of the magazine is bent to provide a depending run constituting the front side of the second loop which is caused to move past the exposure gate of the camera under the control of the claw also mounted in the camera for feeding the film between two exposure times. The next portion of the film strip is directed upwards to constitute the rear side of the second loop.

Then the exposed film strip engages the take-up drum and is directed thereby towards the take-up spool on which it is subsequently wound. The movement of rotation applied to the unitary member constituting said pair of sprocket drums and also to the take-up spool is produced by driving members of the camera mechanism which are operatively connected to said unitary member and the shaft of said takeup spool when the magazine is inserted in the camera.

Reference will now be made to the attached drawings illustrating diagrammatically by way of example a typical form of embodiment of the film magazine according to this invention, it being understood that various constructional details thereof may be modified without departing from the spirit and scope of the invention as set forth in the appended claims. In the drawings:

FIG. 1 is a perspective view showing the path of the film as obtained in a film magazine according to this invention;

FIG. 2 is a perspective view with parts broken away showing the film magazine as seen from the take-up spool side, the corresponding cover being separated from the magazine body;

FIG. 3 is a view similar to FIG. 2 but showing the magazine as seen from the feed spool side;

FIG. 4 is a perspective view showing the magazine closed and as seen from the take-up spool side; and FIG. 5 is a perspective detail view showing the unitary member incorporating the feed drum and take-up drum.

As clearly shown in the drawings, the specific embodiment of the film magazine according to this invention comprises a body 1 in which the feed spool 2 and take-up spool 3 are housed. A cylindrical member 4 shown separately in FIG. 5 comprises on one side the feed sprocket drum 5 and on the other side the take-up sprocket drum 6. The unexposed film initially wound on the feed spool 2 is unwound therefrom to engage the feed drum 5 provided with teeth 7a which engage the film perforations. As the film strip emerges from drum 5, it forms a first loop 8' in a chamber defined in the space between the spools and the side wall of housing 1. Loop 8 is of substantially hairpin configuration, of which the upper run 9 follows a laterally oblique direction in order to bring the film above the take-up spool 3. Then the film is directed downwards to form another loop 10 in a chamber defined in the space between the spools and the front wall of housing 1. Loop 10 is also of substantially hairpin configuration having its front run 11 disposed externally of the magazine and adapted to move past the exposure gate (not shown) of a motion picture camera and to be engaged by the claw of the film driving mechanisms of the camera (not shown). As the film emerges from the second loop 10 its perforations are engaged by the teeth 7b of the take-up drum 6 and the film strip is subsequently directed towards the core of the take-up spool 3 on which it is eventually wound.

The cylindrical member 4 constituting the pair of integral sprocket drums 5 and 6 has an extension, on the take-up spool side, in the form of a trunnion 12 carrying at its outer end a splined knob 13. This splined knob emerges from the magazine wall so as to be drivingly engaged by a rotary member (not shown) of the camera mechanism. Similarly, the take-up spool is detachably and drivingly carried by a shaft 14 mounted in the cover 15 and having an external end portion emerging from this cover in the form of a splined knob 17 adapted to be engaged by and rotatably driven by another rotary member (not shown) of the camera mechanism, said rotary member comprising a conventional friction device for winding the film on the take-up spool at the proper speed.

The lateral covers 15 and 17 are designed to protect the film from the action of light before and after the camera loading.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

Having thus described my invention, what I claim and desire to secure by Letters Patent is:

1. In a motion picture film magazine comprising a housing having a front wall provided with an exposure aperture, a side wall extending rearwardly of said front wall, and two compartments for receiving, respectively, a feed spool and a take-up spool, whereby an unexposed film strip wound on said feed spool is adapted to be unwound therefrom, intermittently moved past said exposure aperture, and wound onto said take-up spool, the improvement comprising:
(a) a substantially cylindrical member disposed intermediate said spools and the junction of said walls and provided with a pair of coaxial sprocket drums adapted to engage and drive said film strip;
(b) one of said sprocket drums being adapted to engage, along a peripheral portion thereof which confronts said junction, said film strip as it is unwound from said feed spool, for controlling the rate of film feed;
(c) the other of said sprocket drums being adapted to engage, along a peripheral portion thereof which confronts said junction, said film strip prior to its being taken up by said take-up spool for controlling the rate of film taken up on said take-up spool;
(d) said side wall being spaced from said compartments and defining therebetween a first narrow longitudinal chamber, and said front wall being spaced from said compartments and defining therebetween a second narrow longitudinal chamber generally perpendicular to said first chamber;
(e) said film strip disposed between said sprocket drums following a path comprising two hairpin shaped loops, the first of said loops being formed in said first chamber as said strip emerges from said one sprocket drum and the second of said loops being formed in said second chamber prior to the engagement of said strip with said other sprocket drum.

2. In a motion picture film magazine in accordance with claim 1, wherein said housing is provided with rear wall means having a pair of parts extending from the remote ends of said side and front walls, respectively, and being substantially tangential to said compartments.

3. In a motion picture film magazine according to claim 1, wherein said film strip is out of engagement with said sprocket drums between the peripheral portions on said one and on said other sprocket drums, respectively, to define a continuous free strip section therebetween.

4. In a motion picture film magazine comprising a housing having a front wall provided with an exposure aperture, a side wall extending rearwardly of said front wall, and two compartments for receiving, respectively, a feed spool and a take-up spool, whereby an unexposed film strip wound on said feed spool is adapted to be unwound therefrom, intermittently moved past said exposure aperture, and wound onto said take-up spool, the improvement comprising:
(a) a substantially cylindrical member disposed intermediate said spools and the junction of said walls and provided with a pair of coaxial sprocket drums adapted to engage and drive said film strip;
(b) one of said sprocket drums being adapted to engage, along a peripheral portion thereof which confronts said junction, said film strip as it is unwound from said feed spool, for controlling the rate of film feed;
(c) the other of said sprocket drums being adapted to engage, along a peripheral portion thereof which confronts said junction, said film strip prior to its being taken up by said take-up spool for controlling the rate of film taken up on said take-up spool;
(d) said film strip disposed between said sprocket drums following a path comprising two hairpin shaped loops, the first of said loops being formed as said strip emerges from said one sprocket drum and the second of said loops being formed as said strip engages said other sprocket drum;
(e) said first loop being located between said compartments and said side wall in the upper portion of said housing and said second loop being located between said compartments and said front wall, said first and second loops being substantially perpendicular to each other.

5. In a motion picture film magazine in accordance with claim 4, wherein said film strip is out of engagement with said sprocket drums between the peripheral portions on said one and on said other sprocket drums, respectively, to define a continuous free strip section therebetween.

6. In a motion picture film magazine according to claim 4, wherein said first loop is formed as the film strip emerges tangentially from said one sprocket drum in a rearward direction and is then bent forwardly in a laterally oblique direction whereby said first loop overlies said take-up spool, and wherein said second loop is formed as the film strip emerging from said first loop is directed to the front of the housing and is bent downwardly to define a front side for said second loop which is adapted to be intermittently moved past said exposure aperture.

7. In a motion picture film magazine according to claim 6, wherein the film strip portion constituting said front side of said second loop is accessible externally of said magazine so as to be engageable by claw feeding means of a camera in which said magazine is inserted.

8. In a motion picture film magazine according to claim 7, wherein said cylindrical member is adapted to engage rotary moving means of a camera in which said magazine is inserted.

9. In a motion picture film magazine according to claim 8, wherein said take-up spool is adapted to be driven by rotary moving means of a camera in which said magazine is inserted.

10. In a motion picture film magazine according to claim 4, wherein said cylindrical member is adapted to engage rotary moving means of a camera in which said magazine is inserted.

11. In a motion picture film magazine according to claim 10, wherein said take-up spool is adapted to be driven by rotary moving means of a camera in which said magazine is inserted.

References Cited

UNITED STATES PATENTS 2,476,705  7/1949  Coutant _____ 352—78 X

JOHN M. HORAN, Primary Examiner

M. H. HAYES, Assistant Examiner

U.S. Cl. X.R.

242—71.2